US012718513B2

(12) United States Patent
Wu et al.

(10) Patent No.: US 12,718,513 B2
(45) Date of Patent: Aug. 25, 2026

(54) FREIGHT CONTAINER IDENTIFICATION MARK LOCATOR SYSTEM AND METHOD THEREOF

(71) Applicant: IRONYUN INC., Hsinchu County (TW)

(72) Inventors: Peng-Jung Wu, Hsinchu County (TW); Jenn-Shiuan Weng, Hsinchu County (TW)

(73) Assignee: IronYun Inc., Zhubei City (TW)

( * ) Notice: Subject to any disclaimer, the term of this patent is extended or adjusted under 35 U.S.C. 154(b) by 223 days.

(21) Appl. No.: 18/666,041

(22) Filed: May 16, 2024

(65) Prior Publication Data

US 2025/0356609 A1 Nov. 20, 2025

(51) Int. Cl.
*G06V 10/25* (2022.01)
*G06T 7/60* (2017.01)

(52) U.S. Cl.
CPC ................ *G06V 10/25* (2022.01); *G06T 7/60* (2013.01); *G06V 2201/07* (2022.01)

(58) Field of Classification Search
CPC ..... G06T 7/11; G06T 7/62; G06T 7/10; G06T 7/60; G06T 2207/30204; G06T 7/73;
(Continued)

(56) References Cited

U.S. PATENT DOCUMENTS 10,043,154 B2 8/2018 King
2017/0237949 A1 8/2017 Wang et al.
(Continued)

FOREIGN PATENT DOCUMENTS

CN 101650780 A 2/2010
CN 102024144 A 4/2011
(Continued)

OTHER PUBLICATIONS

C.-S. Fahn, B.-Y. Su and M.-L. Wu, "Vision-based identification extraction for freight containers," 2015 International Conference on Wavelet Analysis and Pattern Recognition (ICWAPR), Guangzhou, China, 2015, pp. 51-57, doi: 10.1109/ICWAPR.2015.7295925. (Year: 2015).*

(Continued)

*Primary Examiner* — Courtney Joan Nelson
*Assistant Examiner* — Courtney J Windsor
(74) *Attorney, Agent, or Firm* — Rosenberg, Klein & Lee

(57) ABSTRACT

The present invention provides a freight container identification mark locator system and method thereof. The method includes the following steps: receiving an image having a freight container with a freight container identification mark from a camera unit; identifying a first reference point and a second reference point from the freight container in the image; obtaining a first coordinate of the first reference point and a second coordinate of the second reference point according to a coordinate model; calculating and outputting a representative coordinate for a specified area in the image according to the first coordinate and the second coordinate; wherein the specified area includes the freight container identification mark. The present invention allows subsequently operations to only identify the freight container identification mark in the specified area according to the representative coordinate, and thus subsequently allowing the freight container identification mark in the image to be identified efficiently.

10 Claims, 6 Drawing Sheets

(58) Field of Classification Search
CPC ... G06T 7/13; G06T 7/12; G06T 2207/20112; G06N 20/00; G06N 3/0464; G06N 3/02; G06V 10/267; G06V 2201/06; G06V 20/695; G06V 10/764; G06V 10/25; G06V 2201/08; G06V 30/153; G06V 2201/07; B65C 3/08
See application file for complete search history.

(56) References Cited

U.S. PATENT DOCUMENTS

2018/0315065 A1* 11/2018 Zhang ................ G06Q 30/0206
2022/0084186 A1* 3/2022 Ivens ................... G06N 3/0455

FOREIGN PATENT DOCUMENTS

CN 105701490 A 2/2016
CN 105787894 A 7/2016
CN 110119742 A 8/2019
CN 110378332 A 10/2019
CN 110414318 A 11/2019
CN 112464800 A 3/2021
CN 108596166 B 10/2021
CN 113569829 A * 10/2021 ........... G06F 18/214
CN 115100661 B 1/2023
CN 115690807 A * 2/2023
FI 124528 B 9/2014
TW 201725164 7/2017
TW 202031584 9/2020
TW 202123170 6/2021

OTHER PUBLICATIONS

Machine translation obtained from Google Patents of CN-113569829-A (Year: 2021).*
Machine translation obtained from Google Patents of CN-115690807-A (Year: 2023).*

* cited by examiner

FREIGHT CONTAINER IDENTIFICATION MARK LOCATOR SYSTEM AND METHOD THEREOF

BACKGROUND OF THE INVENTION

1. Field of the Invention

The present invention relates to a locator system and a method thereof, more particularly a freight container identification mark locator system and a method thereof.

2. Description of the Related Art

With globalization, international trades and logistics have enjoyed leaps of development, and among these developments, freight containers play a crucial role for shipping goods internationally. By filling up a freight container with logistical goods, the freight container may be shipped via land or sea across the world. For ease of shipment tracking, storage management of goods, and for security reasons, a freight container identification is crucial for any logistical operations.

According to International Organization for Standardization's international standard ISO 6346, all freight containers around the world would have freight container identification marks printed thereon for ease of identification. However, various different and unique texts and numbers may also be printed on different freight containers. For example, texts and numbers for max gross, tare, and payload may be printed on some freight containers apart from the freight container identification mark. In addition, texts and numbers of trademarks, warning signs for the freight container or for the contained goods may also be printed on the freight container. These various texts and numbers printed on the freight container make it difficult for a conventional image recognition software to recognize the freight container identification mark printed on the freight container among the abundance of information printed on the freight container.

For example, a conventional image recognition software needs to first identify all of the texts and numbers present in an image by analyzing the whole entire image, and then attempts to decipher all of the identified texts and numbers for extracting information of the freight container identification mark among the abundance of information. This method of identifying the freight container identification mark is, however, too complicated and redundant as too many texts and numbers need to be processed. As such, the conventional image recognition software is somewhat inefficient in its speed for identifying the freight container identification mark from the image of a freight container.

Furthermore, the conventional image recognition software is more prone to identification errors regarding texts and numbers, i.e., mistakenly including unrelated texts or numbers that are also printed on the freight container as a part of the freight container identification mark. In essence, the conventional image recognition software is more prone to interference of other miscellaneous information printed on the freight container, and thus the conventional image recognition software is more prone to mistakenly identifying the freight container identification mark.

SUMMARY OF THE INVENTION

The present invention provides a freight container identification mark locator system and a method thereof. By first locating where the freight container identification mark is present in an image having the freight container therein, the present invention is able to efficiently exclude most of the other miscellaneous information printed on the freight container, allowing, subsequently, an image analyzing software to only focus on analyzing a specific area of the freight container for identifying the freight container identification mark more correctly, more efficiently, and more accurately.

The freight container identification mark locator system of the present invention includes a processor unit, a camera unit, and a memory unit. The processor unit is connected to the camera unit and the memory unit respectively. The memory unit stores a coordinate model, and the camera unit is configured to capture an image having a freight container therein with a freight container identification mark. The processor unit is configured to receive the image from the camera unit, identify a first reference point and a second reference point from the freight container in the image, obtain a first coordinate of the first reference point and a second coordinate of the second reference point according to the coordinate model, calculate a representative coordinate for a specified area in the image according to the first coordinate and the second coordinate, and output the representative coordinate. The freight container identification mark is included within the specified area of the present invention.

The freight container identification mark locator method of the present invention is executed by a processor unit, and the method includes the following steps:

receiving an image having a freight container therein with a freight container identification mark from a camera unit;

identifying a first reference point and a second reference point from the freight container in the image;

obtaining a first coordinate of the first reference point and a second coordinate of the second reference point according to a coordinate model; and calculating a representative coordinate for a specified area in the image according to the first coordinate and the second coordinate, and outputting the representative coordinate; wherein the specified area includes the freight container identification mark.

The present invention makes use of a feature that the freight container identification mark will always be printed in a same designated area on the freight container, and thus the present invention is able to calculate and output the representative coordinate for the specified area according to the first coordinate of the first reference point and the second coordinate of the second reference point. When the present invention outputs the representative coordinate for the specified area, a subsequent operation that receives the representative coordinate will be able to locate the specified area according to the representative coordinate, and thus conduct image analysis of the image only for the specified area of the image, and exclude all other parts of the image outside of the specified area as miscellaneous noises unrelated to the freight container identification mark. As such, the subsequent operation that receives the representative coordinate from the present invention is able to identify the freight container identification mark of the freight container from the specified area of the image more effectively and more efficiently with less image pixels having less interfering noises.

Furthermore, instead of calculating the representative coordinate for the specified area by using three or more reference points, the present invention is able to calculate the representative coordinate for the specified area by only using the first coordinate and the second coordinate. After obtaining the first coordinate and the second coordinate, the present invention also avoids directly analyzing the whole image for identifying the freight container identification mark according to the obtained first and second coordinates. By doing so, the present invention avoids the burden of having to analyze the entire abundance of texts and numbers printed on the freight container in the image, as the main goal of the present invention is to figure out the specified area in the image according to the first coordinate and the second coordinate, so that the subsequent operation for image analyzing is able to exclude all information outside of the specified area of the image as noises. For this reason, the present invention improves upon a current method of analyzing the whole entire image for directly identifying the freight container identification mark printed on the freight container.

DETAILED DESCRIPTION OF THE INVENTION

The present invention provides a freight container identification mark locator system and a method thereof.

Figure 1:
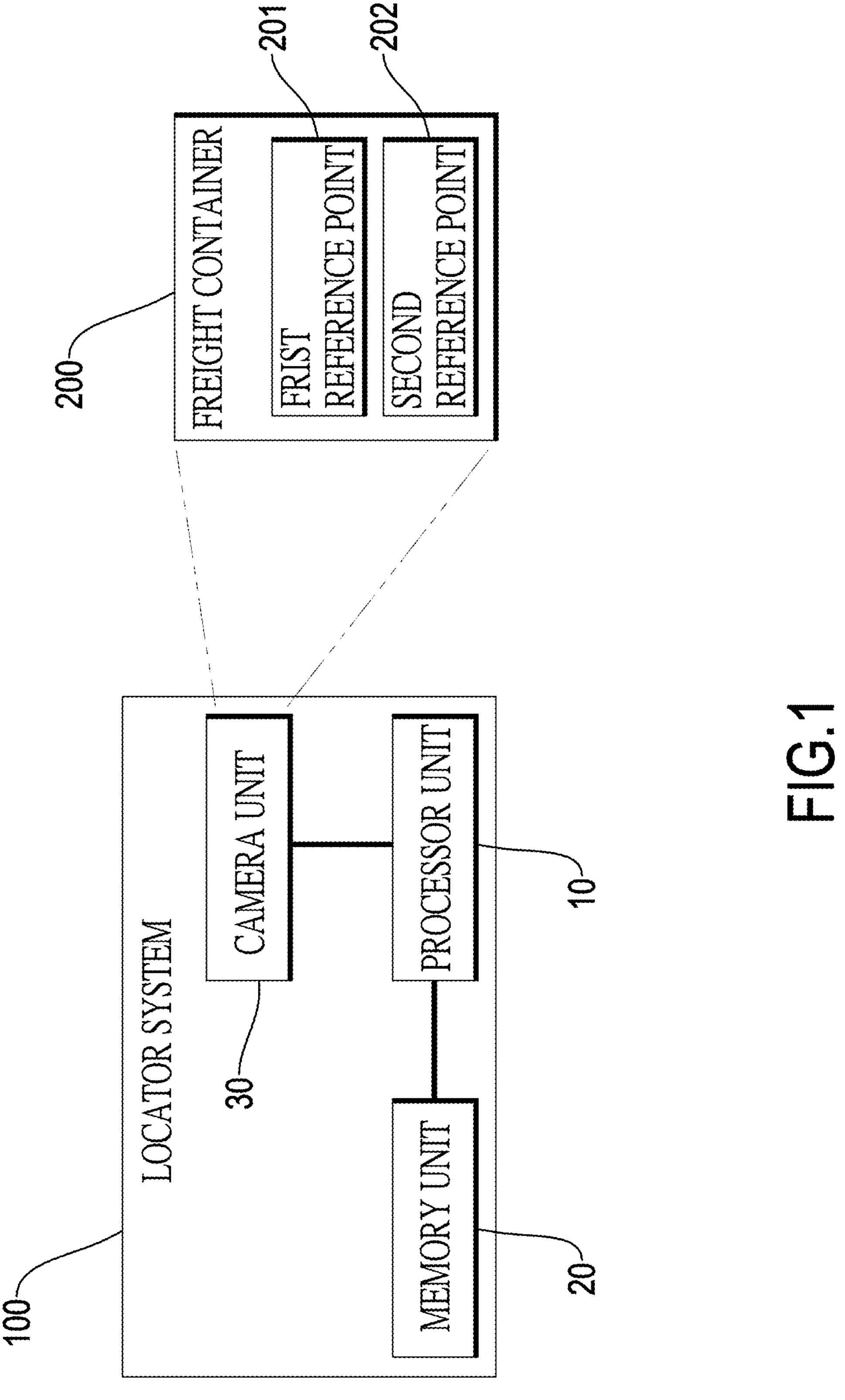
FIG. 1 is a block diagram of an embodiment of a freight container identification mark locator system of the present invention.

With reference to FIG. 1, the present invention provides a locator system 100 for locating freight container identification marks. The locator system 100 includes a processor unit 10, a memory unit 20, and a camera unit 30, and the processor unit 10 is connected to the memory unit 20 and the camera unit 30 respectively.

The memory unit 20 stores a coordinate model. The camera unit 30 captures an image and then sends the image to the processor unit 10. In the present invention, the camera unit 30 is configured to capture an image having a freight container 200 therein, wherein the image includes a freight container identification mark that is printed on the freight container 200 according to International Organization for Standardization's international standard ISO 6346. After the processor unit 10 receives the image from the camera unit 30, the processor unit 10 identifies a first reference point 201 and a second reference point 202 from the freight container 200 in the image. The processor unit 10 obtains a first coordinate of the first reference point 201 and a second coordinate of the second reference point 202 according to the coordinate model stored in the memory unit 20. The processor unit 10 then calculates a representative coordinate for a specified area in the image according to the first coordinate and the second coordinate, and outputs the representative coordinate.

The specified area calculated by the processor unit 10 of the present invention always includes the freight container identification mark of the freight container 200. This is because all freight containers in the world are required to have their respective freight container identification marks, such as their respective owner codes, printed in a fixed designated area on their respective doors. This fixed designated area of any freight containers, such as the freight container 200, has a fixed horizontal distance and vertical distance ratio with reference to four container corner castings of the freight container. Making use of a feature that all freight containers print their freight container identification marks in same designated areas, the present invention is thus able to calculate and output the representative coordinate for the specified area of the freight container 200 in the image according to the first coordinate corresponding to the first reference point 201 and the second coordinate corresponding to the second reference point 202.

When the present invention outputs the representative coordinate for the specified area, a subsequent operation that receives the representative coordinate will be able to locate the specified area according to the representative coordinate, and thus conduct image analysis of the image only for the specified area of the image, and exclude all other parts of the image outside of the specified area as miscellaneous noises unrelated to the freight container identification mark. As such, the subsequent operation that receives the representative coordinate from the present invention is able to identify the freight container identification mark of the freight container 200 from the specified area of the image more effectively and more efficiently with less image pixels having less interfering noises.

Furthermore, instead of calculating the representative coordinate for the specified area by using three or more reference points, the present invention is able to calculate the representative coordinate for the specified area by only using the first coordinate and the second coordinate. After obtaining the first coordinate and the second coordinate, the present invention also avoids directly analyzing the whole image for identifying the freight container identification mark according to the obtained first and second coordinates. By doing so, the present invention avoids the burden of having to analyze the entire abundance of texts and numbers printed on the freight container in the image, as the main goal of the present invention is to figure out the specified area in the image according to the first coordinate and the second coordinate, so that the subsequent operation for image analyzing is able to exclude all information outside of the specified area of the image as noises. For this reason, the present invention improves upon a current method of analyzing the whole entire image for directly identifying the freight container identification mark printed on the freight container.

Moreover, when the present invention identifies the first reference point 201 and the second reference point 202 from the freight container 200 in the image, the present invention only needs to execute an operation of identifying shapes to locate the said two reference points with ease. In comparison to an operation of identifying texts and numbers from the image, the operation of identifying shapes from the image is easier and faster, and therefore, an overall efficiency of the present invention identifying the first reference point 201 and the second reference point 202 is better and more efficient than an overall efficiency of prior arts for identifying all texts and numbers present within the image.

In an embodiment of the present invention, the processor unit 10 is electrically connected to the memory unit 20 and the camera unit 30 respectively. The coordinate model used for identifying the first reference point 201 and the second reference point 202 from the image is a pre-trained artificial intelligence (AI) model. More particularly, the pre-trained AI model is trained through deep learning how to efficiently identify the container corner castings of the container 200 in the image and to further identify the first reference point 201 and the second reference point 202 from the container corner castings of the container 200.

Figure 2:
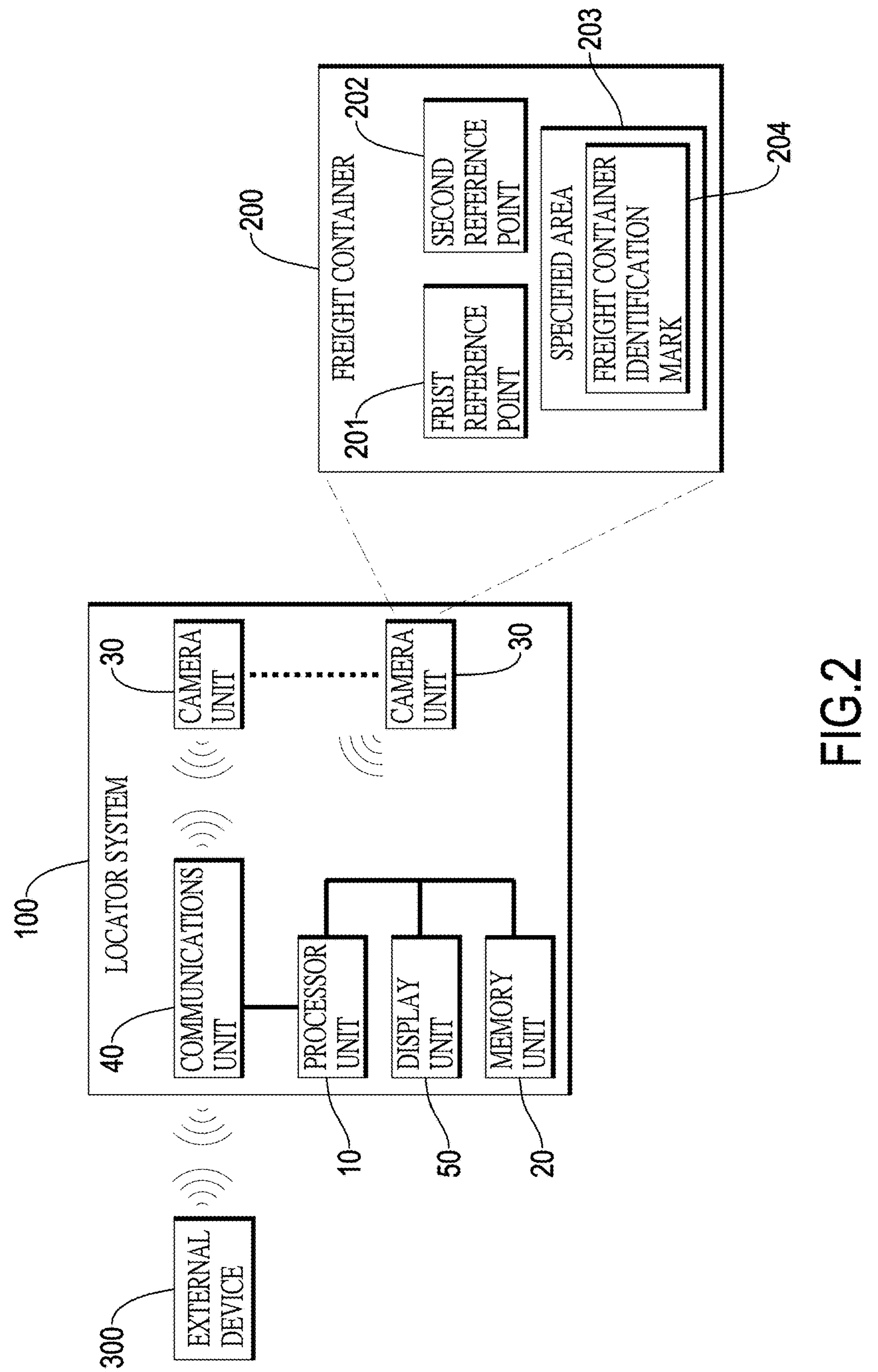
FIG. 2 is a block diagram of another embodiment of the freight container identification mark locator system of the present invention.

With reference to FIG. 2, in another embodiment, the processor unit 10 is electrically connected to the memory unit 20, a communications unit 40, and a display unit 50 respectively. The communications unit 40 is a wireless network communications module, and the processor unit 10 wirelessly connects to a plurality of the camera units 30 and at least one external device 300 via the wireless network communications module. One of the camera units 30 is configured to capture the image having the freight container 200 therein and to send the image to the processor unit 10 via the communications unit 40. The processor unit 10 displays the image in real time by controlling the display unit 50, and the processor unit 10 sends the image to the at least one external device 300 through the communications unit 40, allowing the at least one external device 300 to simultaneously monitor the image captured by the camera unit 30. In another embodiment, the communications unit 40 may also be a hardwired internet communications module or a physical port, such as a USB port, for communicating with the camera units 30 and the at least one external device 300.

Figure 3:
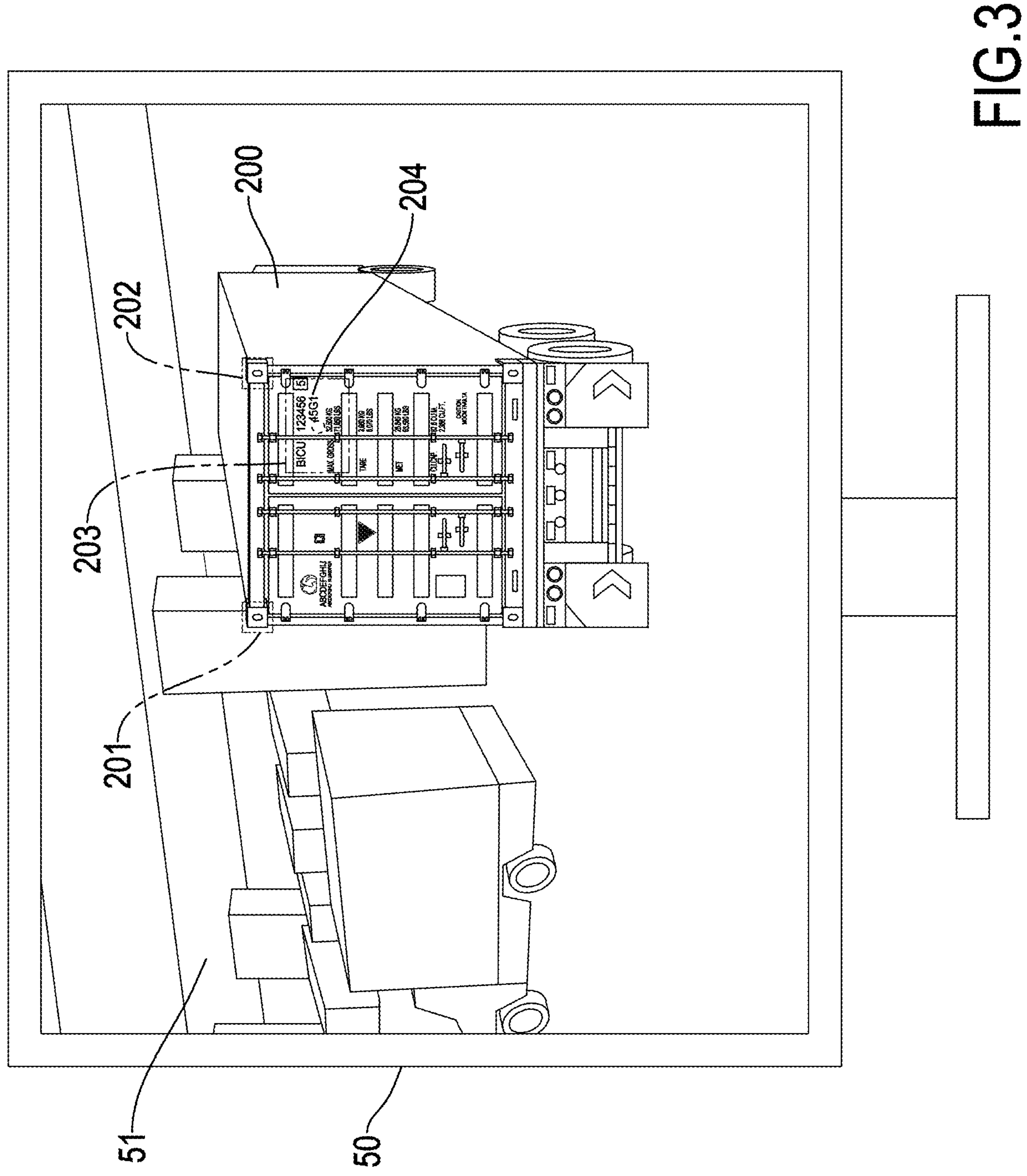
FIG. 3 is a perspective view of a display unit of the freight container identification mark locator system of the present invention displaying an image having a freight container therein having a freight container identification mark.
Figure 4:
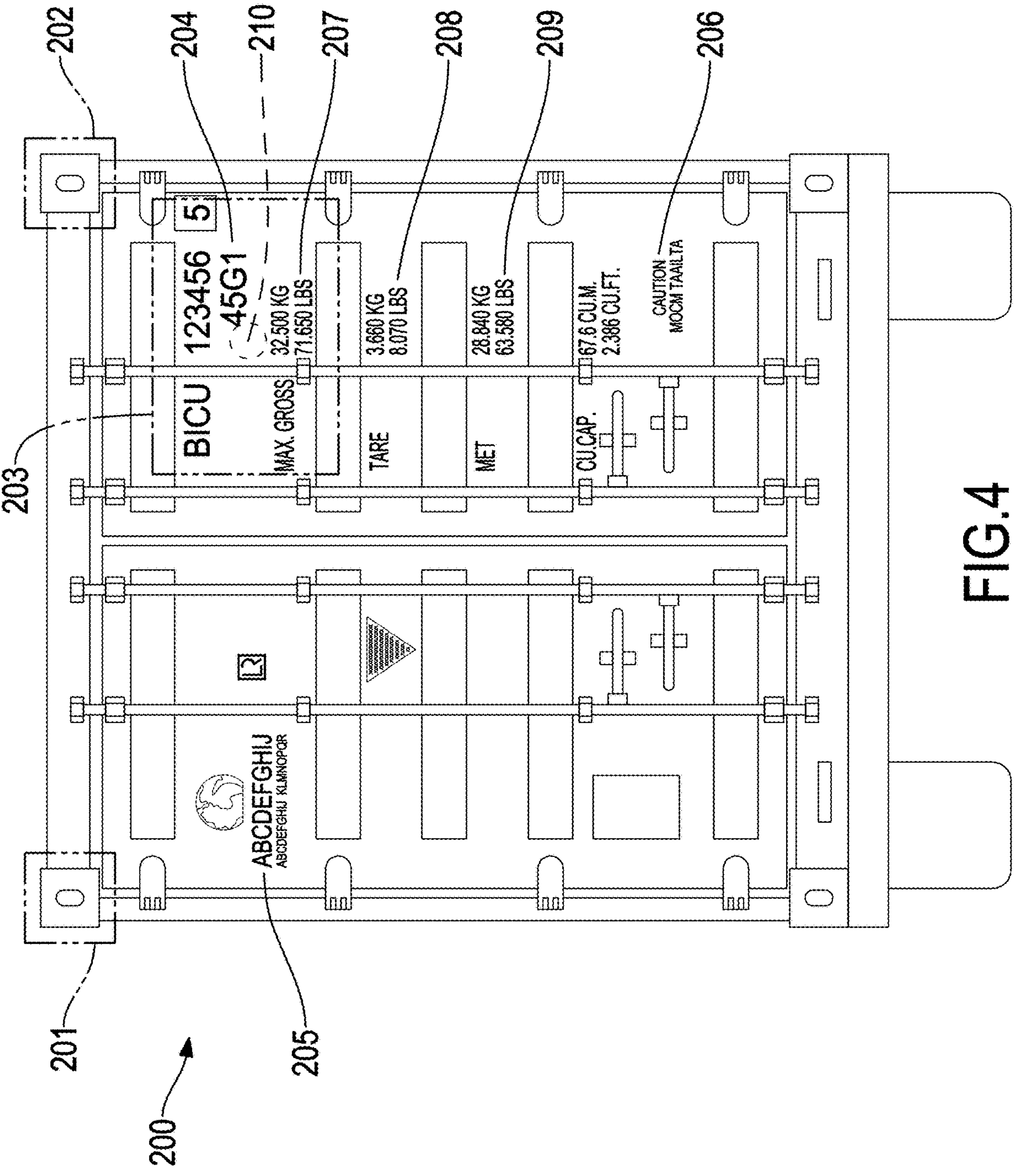
FIG. 4 is an ideal perspective view of an image captured by a camera unit of the freight container identification mark locator system of the present invention.

With reference to FIGS. 3 and 4, FIG. 3 is a perspective view of the display unit 50 displaying an image 51 of the freight container 200. In practice, regarding the image 51 shown in FIG. 3, an angle might exist between the freight container 200 and the camera unit 30 that captures the image 51, a curvature within the image might exist as created by the camera unit 30 having fisheye lens, or a rotation angle within the image might exist as the camera unit 30 has been rotated. The said curvature within the image and the said rotation angle within the image can be digitally processed by the processor unit 10 to re-construct an original form of the image without any curvatures or rotations within the image. Furthermore, even though angles exist between the freight container 200 and the camera unit 30 within the image 51, the present invention is still able to calculate and obtain a specified area 203 that encompasses the freight container identification mark 204. To better demonstrate the freight container identification mark 204 printed on the freight container 200, FIG. 4 provides an ideal perspective view of the image 51 directly facing doors of the freight container 200. With reference to FIG. 4, apart from the freight container identification mark 204 printed inside of the specified area 203 on the freight container 200 in the image 51, the doors of the freight container 200 also has various information printed thereon, such as a trademark information 205, a warning information 206, a max gross information 207, a tare information 208, and a payload information 209.

The first reference point 201 and the second reference point 202 of the freight container 200 used by the present invention are respectively a top left corner and a top right corner of the freight container 200. More particularly, the first reference point 201 and the second reference point 202 are respectively a top left container corner casting and a top right container corner casting of the freight container 200. The present invention uses the top left corner and the top right corner of the freight container 200 as reference points to calculate the specified area 203 because, in practice, the camera unit 30 would be mounted on an elevated position above a road. For example, the camera unit 30 may be mounted on a street lamp, on an overhead bridge, or on a road sign. With reference to FIG. 3, as the camera unit 30 captures the image having the freight container 200 from an elevated angle from the road, the top left corner and the top right corner of the freight container 200 are clearly observed without being obscured by dust or pebbles raised from the road. In comparison, as a bottom left corner and a bottom right corner of the freight container 200 are relatively further from the camera unit 30 than the top left corner and the top right corner of the freight container, and as the bottom left corner and the bottom right corner of the freight container 200 are closer to possible dust or pebbles raised from the road, the bottom left corner and the bottom right corner are more easily obscured, preventing the camera unit 30 for clearly capturing the bottom left corner and the bottom right corner of the freight container 200 in the image 51. Furthermore, hypothetically, if the top left corner and the bottom left corner of the freight container 200 are used to obtain a left border of the freight container 200, or if the top right corner and the bottom right corner of the freight container 200 are used to obtain a right border of the freight container 200, the left border and the right border of the freight container 200 would prone to be visually covered or interfered by other vehicles on the road.

The present invention takes in the above-mentioned considerations to decide using the top left corner and the top right corner as two reference points for calculating the specified area 203. As such, the specified area 203 may be more correctly calculated using more defined reference points, and thus, subsequent operations may more effectively and efficiently identify the freight container identification mark 204 from the accurately-calculated specified area 203. Furthermore, since the container corner castings are mostly structurally identical for all freight containers, the top left container corner casting and the top right container corner casting stay structurally unchanged across different freight containers, and thus allowing the top left corner and the top right corner of the freight container 200 to be easily identified. As such, by using the top left corner and the top right corner of the freight container 200 as the first reference point 201 and the second reference point 202, the first reference point 201 and the second reference point 202 can be accurately identified from the image 51, thus ensuring the specified area 203 can be further accurately defined.

By defining the specified area 203 in the image 51, the present invention keeps the freight container identification mark 204 in the image 51 while disregarding any other pixels of the image located outside of the specified area 203. Even though the specified area 203 in the image 51 may still encompass few pieces of information unrelated to the freight container identification mark 204, most pieces of information unrelated to the freight container identification mark 204 are still outside of the specified area 203 and are being removed and disregarded. As such, the present invention drastically decreases an amount of unrelated information, in other words, noises, that are being subsequently analyzed for identifying the freight container identification mark 204, and the present invention allows the freight container identification mark 204 to be more efficiently identified. With reference to FIG. 4, the specified area 203 encompasses the freight container identification mark 204 and the max gross information 207. Outside of the specified area 203, the trademark information 205, the warning information 206, the tare information 208, and the payload information 209 are viewed as noises and filtered out. When subsequent operations attempt to identify the freight container identification mark 204, the subsequent operations only need to decipher the freight container identification mark 204 from two pieces of information within the specified area 203, i.e., the freight container identification mark 204 and the max gross information 207, instead of having to decipher the freight container identification mark 204 from an abundance of other various miscellaneous information. Various prior arts already revealed methods to numerically identify numbers from an area of an image, such as from the specified area 203 of the image 51. As an operation to numerically identify the freight container identification mark 204 from the specified area 203 deviates from the main point of the present invention, the operation used to numerically identify the freight container identification mark 204 is hereby omitted from further descriptions.

The following describes steps of how the specified area 203 is calculated from the first reference point 201 and the second reference point 202 in the present invention. When the processor unit 10 receives the image 51, the processor unit 10 maps the image 51 on a two-dimensional (2D) coordinate system consisting an x-axis and a y-axis. In an embodiment, the 2D coordinate system has the x-axis and the y-axis intercept at a top left corner of the image 51, which means the top left corner of the image 51 can be labeled as (0, 0) in the 2D coordinate system. The image 51 in the 2D coordinate system has increasing x-axis values moving towards the right side of the image 51 and increasing y-axis values moving towards the bottom of the image 51.

The first coordinate of the first reference point 201 is ($X_L$, $Y_L$), and the second coordinate of the second reference point 202 is ($X_R$, $Y_R$). The representative coordinate for the specified area 203 is (X, Y, W, H), wherein X and Y are configured to specify a center point 210 of the specified area 203, W is configured to specify a width of the specified area 203, and H is configured to specify a height of the specified area 203. A position of the center point 210 may be represented as (X, Y), and the center point 210 is positioned at an intersection of half of the length of W and half of the height of H for the specified area 203.

In the present embodiment, the memory unit 20 stores a first constant and a second constant. The first constant may be represented as $C_1$, and the second constant may be represented as $C_2$. A user of the present invention may freely define the first constant and the second constant stored within the memory unit 20. When the processor unit 10 calculates the representative coordinate for the specified area 203 of the freight container 200 according to the first coordinate and the second coordinate, the processor unit 10 executes the following steps:

Calculating a prediction width according to a difference between $X_R$ and $X_L$. For example, the processor unit 10 calculates the prediction width as $(X_R - X_L)*(C_1/2)$, and the processor unit 10 by default sets a first variable equal to the prediction width and sets a second variable equal to the prediction width. The first variable may be represented as w, and then the second variable may be represented as h. Furthermore, if the prediction width is represented as $W_{ROI}$, then the prediction width satisfies the following formula:

$$W_{ROI} = (X_R - X_L) * (C_1/2).$$

Calculating a prediction horizontal point according to an average of $X_R$ and $X_L$. For example, the processor unit 10 calculates the prediction horizontal point as $(X_R+X_L)/2$. If the prediction horizontal point is represented as $X_{ROI}$, then the prediction horizontal point satisfies the following formula:

$$X_{ROI} = (X_R + X_L)/2.$$

Calculating a prediction vertical point according to a difference between the prediction width and whichever one of $Y_R$ and $Y_L$ that is greater. For example, the processor unit 10 calculates the prediction vertical point as whichever one of $Y_R$ and $Y_L$ that is greater minus ((the prediction width)*$(C_1-1)/2$. If the prediction vertical point is represented as $Y_{ROI}$, then:

when $Y_R > Y_L$, the prediction vertical point is calculated as:

$$Y_{ROI} = Y_R - (W_{ROI} * (C_1 - 1)/2);$$

when $Y_L > Y_R$, the prediction vertical point is calculated as:

$$Y_{ROI} = Y_L - (W_{ROI} * (C_1 - 1)/2).$$

Obtaining an image width and an image height from the image.

Determining whether w plus the predication horizontal point is greater than the image width; if yes, then updating w equals to the image width minus the predication horizontal point.

Determining whether h plus the predication vertical point is greater than the image height; if yes, then updating h equals to the image height minus the predication vertical point. In other words, if the image width is represented as Wi, and the image height is represented as Hi, then:

when $(w+X_{ROI})>Wi$, updating the first variable as:

$$w = Wi - X_{ROI};$$

when $(h+Y_{ROI})>Hi$, updating the second variable as:

$$h = Hi - Y_{ROI}.$$

Calculating W and H according to the prediction width. For example, the processor unit 10 calculates W equals $w*C_2$ and H equals $h*C_2$. In other words, the width and the height of the specified area 203 are calculated as:

$$W = w * C_2;$$

$$H = h * C_2.$$

Calculating X according to the prediction horizontal point and W, and calculating Y according to the prediction vertical point and H. For example, the processor unit 10 calculates X equals to the prediction horizontal point plus (W/2) and calculates Y equals to the prediction vertical point plus (H/2). In other words, the position of the center point 210 (X, Y) is calculated as:

$$X = X_{ROI} + (W/2);$$

$$Y = Y_{ROI} + (H/2).$$

In an embodiment, when the processor unit 10 maps the image 51 in the 2D coordinate system with the x-axis and the y-axis, all of the coordinates are greater than or equal to zero both on the x-axis and the y-axis. Furthermore, the calculation of the prediction width, and the calculations of W, Y, W, and H are all rounding respective calculation results to an integer (int) for simplifying calculations and standardizing the calculation results, and thus allowing the processor unit 10 to calculate more efficiently. In an embodiment, $C_1$ equals to 1.2, and $C_2$ equals to 1.1. As $C_1$ and $C_2$ are greater than one, the calculations of W, Y, W, and H are calculated more loosely. For example, $C_1$ is configured to adjust a length of the prediction width, and this indirectly adjusts the width and the height of the specified area 203. On the other hand, $C_2$ is configured to directly adjust the width and the height of the specified area 203. The greater $C_1$ and $C_2$ are, the greater the width and the height of the specified area 203 of the present invention are, allowing the specified area 203 to loosely encompass greater amount of pixel information from the image 51, and thus allowing subsequent operations to analyze the specified area 203 that has a higher chance to completely include the freight container identification mark 204 of the freight container 200. In the current embodiment, the width and the height of the specified area 203 are defined by $C_2$ with the same ratio, and thus the specified area 203 is a square area. In other embodiments, the specified area 203 may also be a differently shaped area, such as being a rectangle with different width and height ratios.

After the processor unit 10 of the present invention finishes calculating the represented coordinate for the specified area 203, the processor unit 10 stores the represented coordinate for the specified area 203 in the memory unit 20. The processor unit 10 may also control the communications unit 40 to send the represented coordinate for the specified area 203 to the at least one external device 300, allowing the at least one external device 300 to execute subsequent operations for analyzing the specified area 203 to identify the freight container identification mark 204. In an embodiment, the processor unit 10 may also execute an image segmentation operation by cropping the specified area 203 of the image 51, and the processor unit 10 may also control the display unit 50 to display an enlarged view of the freight container identification mark 204 within the specified area 203 of the image 51. This way the user of the present invention is able to visually read the freight container identification mark 204 of the freight container 200 in real time with ease.

In an embodiment, the processor unit 10, the memory unit 20, and the camera unit 30 are respectively a processor, a memory, and a camera of an electronic device, such as a computer, a smart phone, a tablet computer, or a smart surveillance camera. In another embodiment, the processor unit 10 is a cloud processor, and the memory unit 20 is a cloud memory. The cloud processor and the cloud memory belong to a cloud server, and the camera unit 30 is one of many surveillance cameras connected to the cloud server. The at least one external device 300 is a computer or a smart device, such as a smart phone or a tablet computer. In this scenario, the processor unit 10, the memory unit 20, the camera units 30, the communications unit 40, the display unit 50, and the at least one external device 300 form a physical system, such as a security surveillance system with the cloud server connected to multiple Internet of Things (IoT) surveillance cameras and multiple monitors corresponding to the IoT surveillance cameras.

Figure 5:
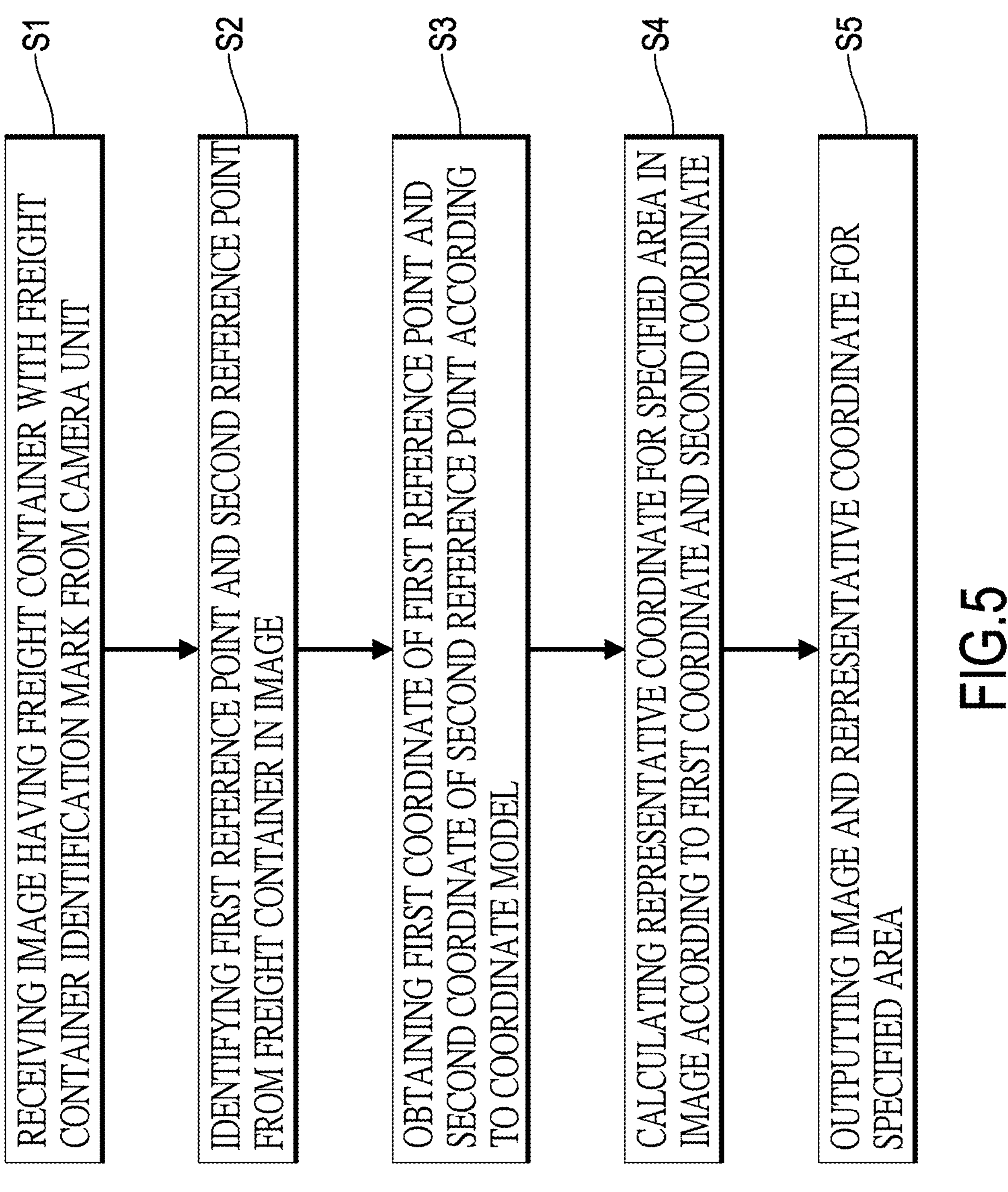
FIG. 5 is a flow chart of an embodiment of a freight container identification mark locator method of the present invention.

With reference to FIG. 5, the present invention also provides a locator method for the freight container identification mark. The locator method is executed by a processor unit. As the locator method corresponds to the aforementioned detail descriptions, the locator method includes the following steps:

Step S1: receiving an image having a freight container with a freight container identification mark from a camera unit.

Step S2: identifying a first reference point and a second reference point from the freight container in the image.

Step S3: obtaining a first coordinate of the first reference point and a second coordinate of the second reference point according to a coordinate model.

Step S4: calculating a representative coordinate for a specified area in the image according to the first coordinate and the second coordinate, wherein the specified area includes the freight container identification mark.

Step S5: outputting the image and the representative coordinate for the specified area.

Figure 6:
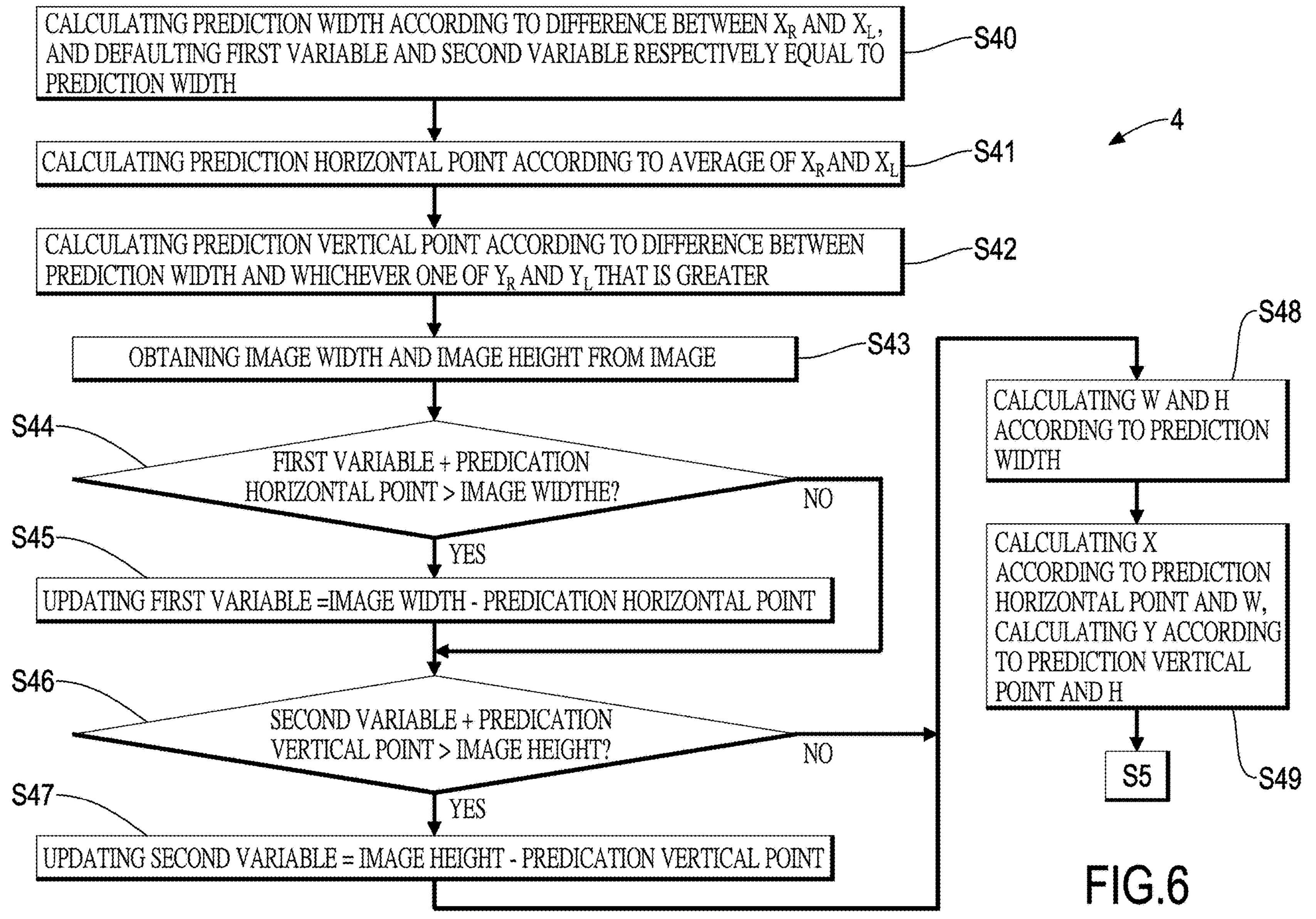
FIG. 6 is another flow chart of the embodiment of the freight container identification mark locator method of the present invention.

With reference to FIG. 6, in an embodiment, step S4 further includes the following sub-steps:

Step S40: calculating a prediction width according to a difference between $X_R$ and $X_L$, and defaulting a first variable and a second variable respectively equal to the prediction width. For example, the prediction width is calculated as $(X_R-X_L)*(C_1/2)$, and if $W_{ROI}$ represents the prediction width, then $W_{ROI}=(X_R-X_L)*(C_1/2)$. Furthermore, if w represents the first variable, and h represents the second variable, then $w=W_{ROI}$ and $h=W_{ROI}$.

Step S41: calculating a prediction horizontal point according to an average of $X_R$ and $X_L$. For example, the prediction horizontal point is calculated as $(X_R+X_L)/2$, and if $X_{ROI}$ represents the prediction horizontal point, then $X_{ROI}=(X_R+X_L)/2$.

Step S42: calculating a prediction vertical point according to a difference between the prediction width and whichever one of $Y_R$ and $Y_L$ that is greater. For example, the prediction vertical point is calculated as whichever one of $Y_R$ and $Y_L$ that is greater minus ((the prediction width)*$(C_1-1)/2$. If $Y_{ROI}$ represents the prediction vertical point, then when $Y_R>Y_L$, the prediction vertical point is calculated as $Y_{ROI}=Y_R-(W_{ROI}*(C_1-1)/2)$, and when $Y_L>Y_R$, the prediction vertical point is calculated as $Y_{ROI}=Y_L-(W_{ROI}*(C_1-1)/2)$.

Step S43: obtaining an image width and an image height from the image. For example, the image width is represented as Wi, and the image height is represented as Hi.

Step S44: determining whether a first variable plus the predication horizontal point is greater than the image width, in other words, determining whether $(w+X_{ROI})>Wi$. When determining that the first variable plus the predication horizontal point is less than or equal to the image width, in other words, when determining $(w+X_{ROI})\leq Wi$, executing step S46.

Step S45: When determining that the first variable plus the predication horizontal point is greater than the image width, in other words, when determining $(w+X_{ROI})>Wi$, updating the first variable to equal the image width minus the predication horizontal point, in other words, updating that $w=Wi-X_{ROI}$.

Step S46: determining whether a second variable plus the predication vertical point is greater than the image height, in other words, determining whether $(h+Y_{ROI})>Hi$. When determining that the second variable plus the predication vertical point is less than or equal to the image height, in other words, when determining $(h+Y_{ROI})\leq Hi$, executing step S48.

Step S47: When determining that the second variable plus the predication vertical point is greater than the image height, in other words, when determining $(h+Y_{ROI})>Hi$, updating the second variable to equal the image height minus the predication vertical point, in other words, updating that $h=Hi-Y_{ROI}$.

Step S48: calculating W and H according to the prediction width. For example, calculating W as w multiplied by $C_2$, calculating H as h multiplied by $C_2$, in other words, calculating $W=w*C_2$, and $H=h*C_2$.

Step S49: calculating X according to the prediction horizontal point and W, and calculating Y according to the prediction vertical point and H. For example, calculating X as the prediction horizontal point plus (W/2) and calculating Y as the prediction vertical point plus (H/2), in other words, calculating $X=X_{ROI}+(W/2)$ and $Y=Y_{ROI}+(H/2)$.

What is claimed is:

1. A freight container identification mark locator method, executed by a processor unit, and comprising the following steps:

receiving an image having a freight container therein with a freight container identification mark from a camera unit;

identifying a first reference point and a second reference point from the freight container in the image;

obtaining a first coordinate of the first reference point and a second coordinate of the second reference point according to a coordinate model; and calculating a representative coordinate for a specified area in the image according to the first coordinate and the second coordinate, and outputting the representative coordinate; wherein the specified area comprises the freight container identification mark;

wherein the first coordinate of the first reference point is $(X_L, Y_L)$, and the second coordinate of the second reference point is $(X_R, Y_R)$;

wherein the representative coordinate for the specified area is (X, Y, W, H), wherein X and Y are configured to specify a center point of the specified area. W is configured to specify a width of the specified area, and H is configured to specify a height of the specified area;

wherein the step of calculating the representative coordinate for the specified area in the image according to the first coordinate and the second coordinate, and outputting the representative coordinate, further comprises the following sub-steps:

calculating a prediction width according to a difference between $X_R$ and $X_L$;

calculating a prediction horizontal point according to an average of $X_R$ and $X_L$;

calculating a prediction vertical point according to a difference between the prediction width and whichever one of $Y_R$ and $Y_L$ that is greater;

calculating W and H according to the prediction width; and calculating X according to the prediction horizontal point and W, and calculating Y according to the prediction vertical point and H.

2. The freight container identification mark locator method as claimed in claim 1, wherein the first reference point and the second reference point respectively correspond to a top left corner casting and a top right corner casting of the freight container.

3. The freight container identification mark locator method as claimed in claim 1, wherein the step of calculating the prediction width according to the difference between $X_R$ and $X_L$ calculates the prediction width as:

$W_{ROI}=(X_R-X_L)*(C_1/2)$; wherein $C_1$ is a first constant, and $W_{ROI}$ is the prediction width;

wherein the step of calculating the prediction horizontal point according to the average of $X_R$ and $X_L$ calculates the prediction horizontal point as:

$X_{ROI}=(X_R+X_L)/2$; wherein $X_{ROI}$ is the prediction horizontal point;

wherein the step of calculating the prediction vertical point according to the difference between the prediction width and whichever one of $Y_R$ and $Y_L$ that is greater comprises the following:

when $Y_R>Y_L$, calculating the prediction vertical point as:

$Y_{ROI}=Y_R-(W_{ROI}*(C_1-1)/2)$; wherein $Y_{ROI}$ is the prediction vertical point; and when $Y_L>Y_R$, calculating the prediction vertical point as:

$$Y_{ROI}=Y_L-\left(W_{ROI}*(C_1-1)/2\right).$$

4. The freight container identification mark locator method as claimed in claim 3, wherein the step of calculating W and H according to the prediction width calculates the width and the height of the specified area as:

$$w=W_{ROI};\ W=w*C_2;$$
$$h=W_{ROI};\ H=h*C_2;$$

wherein $C_2$ is a second constant, w is a first variable, and h is a second variable;

wherein the step of calculating X according to the prediction horizontal point and W, and calculating Y according to the prediction vertical point and H calculates a position of the center point as:

$$X=X_{ROI}+(W/2);$$
$$Y=Y_{ROI}+(H/2);$$

wherein the position of the center point is represented as (X,Y).

5. The freight container identification mark locator method as claimed in claim 4, wherein between the step of calculating the prediction vertical point according to the difference between the prediction width and whichever one of $Y_R$ and $Y_L$ that is greater and the step of calculating W and H according to the prediction width, further comprising the following steps:

obtaining an image width and an image height from the image;

when $(w+X_{ROI})>Wi$, updating the first variable as:

$w=Wi-X_{ROI}$; wherein Wi is the image width; and when $(h+Y_{ROI})>Hi$, updating the second variable as:

$h=Hi-Y_{ROI}$; wherein Hi is the image height.

6. A freight container identification mark locator system, comprising:

a memory unit, storing a coordinate model;

a camera unit, configured to capture an image having a freight container therein with a freight container identification mark; and a processor unit, connected to the camera unit and the memory unit; wherein the processor unit is configured to:

receive the image from the camera unit;

identify a first reference point and a second reference point from the freight container in the image;

obtain a first coordinate of the first reference point and a second coordinate of the second reference point according to the coordinate model; and calculate a representative coordinate for a specified area in the image according to the first coordinate and the second coordinate, and output the representative coordinate; wherein the specified area comprises the freight container identification mark;

wherein the first coordinate of the first reference point is $(X_L, Y_L)$, and the second coordinate of the second reference point is $(X_R, Y_R)$;

wherein the representative coordinate for the specified area is (X, Y, W, H). wherein X and Y are configured to specify a center point of the specified area, W is configured to specify a width of the specified area, and H is configured to specify a height of the specified area;

wherein when the processor unit calculates the representative coordinate for the specified area in the image according to the first coordinate and the second coordinate, and outputs the representative coordinate, the processor unit is configured to:

calculate a prediction width according to a difference between $X_R$ and $X_L$;

calculate a prediction horizontal point according to an average of $X_R$ and $X_L$;

calculate a prediction vertical point according to a difference between the prediction width and whichever one of $Y_R$ and $Y_L$ that is greater;

calculate W and H according to the prediction width; and calculate X according to the prediction horizontal point and W, and calculate Y according to the prediction vertical point and H.

7. The freight container identification mark locator system as claimed in claim 6, wherein the first reference point and the second reference point respectively correspond to a top left corner casting and a top right corner casting of the freight container.

8. The freight container identification mark locator system as claimed in claim 6, wherein:

the memory unit stores a first constant;

when the processor unit calculates the prediction width according to the difference between $X_R$ and $X_L$, the processor unit calculates the prediction width as:

$W_{ROI}=(X_R-X_L)*(C_1/2)$; wherein $C_1$ is the first constant, and $W_{ROI}$ is the prediction width;

when the processor unit calculates the prediction horizontal point according to the average of $X_R$ and $X_L$, the processor unit calculates the prediction horizontal point as:

$X_{ROI}=(X_R+X_L)/2$; wherein $X_{ROI}$ is the prediction horizontal point;

when the processor unit calculates the prediction vertical point according to the difference between the prediction width and whichever one of $Y_R$ and $Y_L$ that is greater, the processor unit executes the following:

when $Y_R>Y_L$, the processor unit calculates the prediction vertical point as:

$Y_{ROI}=Y_R-(W_{ROI}*(C_1-1)/2)$; wherein $Y_{ROI}$ is the prediction vertical point; and when $Y_L>Y_R$, the processor unit calculates the prediction vertical point as:

$$Y_{ROI} = Y_L - (W_{ROI} * (C_1 - 1)/2).$$

9. The freight container identification mark locator system as claimed in claim 8, wherein:

the memory unit stores a second constant;

when the processor unit calculates W and H according to the prediction width, the processor unit calculates the width and the height of the specified area as:

$$w = W_{ROI};\ W = w * C_2;$$

$h=W_{ROI}$; $H=h*C_2$; wherein $C_2$ is the second constant, w is a first variable, and h is a second variable; and when the processor unit calculates X according to the prediction horizontal point and W, and calculates Y according to the prediction vertical point and H, the processor unit calculates a position of the center point as:

$$X = X_{ROI} + (W/2);$$

$$Y = Y_{ROI} + (H/2);$$

wherein the position of the center point is represented as (X, Y).

10. The freight container identification mark locator system as claimed in claim 9, wherein between the processor unit calculates the prediction vertical point according to the difference between the prediction width and whichever one of $Y_R$ and $Y_L$ that is greater and the processor unit calculates W and H according to the prediction width, the processor unit is configured to:

obtain an image width and an image height from the image;

when $(w+X_{ROI})>Wi$, update the first variable as:

$w=Wi-X_{ROI}$; wherein Wi is the image width; and when $(h+Y_{ROI})>Hi$, update the second variable as:

$h=Hi-Y_{ROI}$, wherein Hi is the image height.

* * * * *